United States Patent
Overton et al.

(10) Patent No.: US 7,230,653 B1
(45) Date of Patent: Jun. 12, 2007

(54) METHOD AND APPARATUS FOR REAL TIME INSERTION OF IMAGES INTO VIDEO

(75) Inventors: Kenneth J. Overton, Plano, TX (US); Mark S. Muench, Carrollton, TX (US); Charles H. Hayden, Jr., Plano, TX (US); Norman S. Carmichael, Flower Mound, TX (US)

(73) Assignee: Vistas Unlimited, Plano, TX (US)

( * ) Notice: Subject to any disclaimer, the term of this patent is extended or adjusted under 35 U.S.C. 154(b) by 258 days.

(21) Appl. No.: 09/707,624

(22) Filed: Nov. 7, 2000

Related U.S. Application Data (60) Provisional application No. 60/164,313, filed on Nov. 8, 1999.

(51) Int. Cl.
*H04N 5/262* (2006.01)
*H04N 9/74* (2006.01)

(52) U.S. Cl. .................. 348/584; 348/586; 348/589; 348/598; 382/284

(58) Field of Classification Search ................ 348/584, 348/586, 589, 590, 591, 598, 600, 722, 578, 348/36, 39, 135, 137, 140, 143, 211.9; 382/284, 382/282, 283; 725/32, 36; 345/419, 420, 345/421
See application file for complete search history.

(56) References Cited

U.S. PATENT DOCUMENTS

| | | | |
|---|---|---|---|
| 4,084,184 A | 4/1978 | Crain | |
| 4,693,378 A | 9/1987 | Azegami et al. | |
| 4,970,666 A | 11/1990 | Welsh et al. | |
| 5,264,933 A | 11/1993 | Rosser et al. | |
| 5,353,392 A | 10/1994 | Luquet et al. | |
| 5,424,770 A * | 6/1995 | Schmelzer et al. | ........... 725/36 |
| 5,436,672 A | 7/1995 | Medioni et al. | |

(Continued)

FOREIGN PATENT DOCUMENTS

EP  0 792 068 B1  8/1997

(Continued)

OTHER PUBLICATIONS

Schofield, et al., "A System for Counting People in Video Images Using Neural Networks to Identify the Background Scene," Pattern Recognition, vol. 29, No. 8, pp. 1421-1428, Aug. 1, 1996.

(Continued)

*Primary Examiner*—Lin Ye
*Assistant Examiner*—Jean W. Désir
(74) *Attorney, Agent, or Firm*—Marc A. Hubbard; Gardere Wynne Sewell LLP (57) ABSTRACT

The present invention comprises a real time image insertion system for video utilizes a three-dimensional model of at least one target area within a site for identifying the target area within an original video image of the site, and for rendering a target image and inserting it into the target area of the video image. The target area may be a real, existing surface of the site or an imaginary surface defined only in the model. The model is rendered from the position and angle of a camera that generated the video image. By using a three dimensional model of the site to generate the target image, the resulting image with the inserted target material appears more realistic.

29 Claims, 6 Drawing Sheets

U.S. PATENT DOCUMENTS

| | | | |
|---|---|---|---|
| 5,479,597 | A | 12/1995 | Fellous |
| 5,491,517 | A * | 2/1996 | Kreitman et al. ........... 348/581 |
| 5,515,485 | A | 5/1996 | Luquet et al. |
| 5,543,856 | A | 8/1996 | Rosser et al. |
| 5,566,251 | A * | 10/1996 | Hanna et al. ................ 382/284 |
| 5,600,366 | A * | 2/1997 | Schulman .................... 725/36 |
| 5,627,915 | A | 5/1997 | Rosser et al. |
| 5,640,320 | A | 6/1997 | Jackson et al. |
| 5,715,018 | A * | 2/1998 | Fasciano et al. ............ 348/722 |
| 5,731,846 | A * | 3/1998 | Kreitman et al. ........... 348/581 |
| 5,808,695 | A | 9/1998 | Rosser et al. |
| 5,850,352 | A * | 12/1998 | Moezzi et al. .............. 345/419 |
| 5,892,554 | A | 4/1999 | DiCicco et al. |
| 5,903,317 | A | 5/1999 | Sharir et al. |
| 5,917,553 | A | 6/1999 | Honey et al. |
| 5,923,365 | A | 7/1999 | Tamir et al. |
| 5,953,076 | A | 9/1999 | Astle et al. |
| 6,100,925 | A | 8/2000 | Rosser et al. |
| 6,122,013 | A | 9/2000 | Tamir et al. |
| 6,208,387 | B1 * | 3/2001 | Magnusson et al. ........ 348/578 |
| 6,262,778 | B1 * | 7/2001 | Nonweiler et al. ......... 348/586 |
| 6,266,100 | B1 | 7/2001 | Gloudemans et al. |
| 6,292,227 | B1 * | 9/2001 | Wilf et al. .................. 348/587 |
| 6,297,853 | B1 | 10/2001 | Sharir et al. |
| 6,327,004 | B1 * | 12/2001 | Miyabayashi et al. ...... 348/590 |
| 6,366,316 | B1 * | 4/2002 | Parulski et al. ............. 348/239 |
| 6,384,871 | B1 * | 5/2002 | Wilf et al. .................. 348/578 |
| 6,393,162 | B1 * | 5/2002 | Higurashi ................... 382/284 |
| 6,441,864 | B1 * | 8/2002 | Minami et al. ............. 348/584 |
| 6,446,261 | B1 * | 9/2002 | Rosser ........................ 725/34 |
| 6,487,721 | B1 * | 11/2002 | Safadi ......................... 725/36 |
| 6,522,787 | B1 * | 2/2003 | Kumar et al. ................ 382/268 |
| 6,525,741 | B1 * | 2/2003 | Klassen et al. ............. 345/589 |
| 6,731,788 | B1 | 5/2004 | Agnihotri et al. |

FOREIGN PATENT DOCUMENTS

| | | |
|---|---|---|
| EP | 0907145 | 4/1999 |
| FR | 2 730 837 | 8/1996 |
| WO | 9510919 | 4/1995 |
| WO | WO 96/05689 | 2/1996 |
| WO | WO 97/03517 | 1/1997 |
| WO | WO 97/09822 | 3/1997 |
| WO | WO 97/12480 | 4/1997 |
| WO | WO 97/26758 | 7/1997 |
| WO | WO 98/28906 | 7/1998 |
| WO | WO 99/26415 | 5/1999 |
| WO | WO 99/48285 | 9/1999 |

OTHER PUBLICATIONS

McKenna, et al., "Tracking Groups of People," Computer Vision and Image Understanding, vol. 80, No. 1, pp. 42-56, Oct. 27, 2000.

Overton, Kenneth J., et al., "Method and System for Measurement of the Duration an Area is Included in an Image Stream," U.S. Appl. No. 09/903,122, filed Jul. 10, 2001.

* cited by examiner

FIG. 17

METHOD AND APPARATUS FOR REAL TIME INSERTION OF IMAGES INTO VIDEO

RELATED APPLICATIONS

The present application claims the benefit of co-pending U.S. Provisional Patent Application No. 60/164,313 entitled "METHOD AND APPARATUS FOR REAL TIME INSERTION OF IMAGES INTO VIDEO," filed Nov. 8, 1999, the disclosure of which is incorporated herein by reference.

TECHNICAL FIELD OF THE INVENTION

This invention relates in general to the field of inserting images into streams of video images on a real time basis so that the images appear to be part of the original video image stream.

BACKGROUND OF THE INVENTION

Many systems and methods have been proposed for inserting static and dynamic images, such as advertising, into video in real time. These prior art systems and methods suffer from various drawbacks and problems, many of which are detailed in U.S. Pat. No. 5,892,554 to DiCicco, et al.

More current systems and methods, including the one disclosed by DiCicco, et al, rely on pattern recognition techniques for identifying landmarks within an image. The spatial relationships among the landmarks within the video image are used to locate, size and orient an inserted image. This approach has several problems. First, it is relatively computationally intensive, and therefore tends to require relatively expensive equipment. Second, it does not scale well, meaning that inserting multiple images simultaneously in the same frame is not easily accomplished. Third, it relies on two-dimensional information, gathered from the image, to guide insertion of an image into a three-dimensional scene. The process of creating a two-dimensional image of a three-dimensional world loses information relating to the physical structure of the world. Consequently, the inserted material may not seem realistic.

SUMMARY OF THE INVENTION

An object of the present invention is improved methods and apparatus for inserting real time static and dynamic images into video image streams, which overcome one or more problems with prior art methods and apparatus.

An image insertion system for video according to the invention utilizes a three-dimensional model of at least one target area within a site. The model is rendered from the position and angle of a camera generating a video image into which an image is to be inserted. The rendered model is used to identify a target area within an original video image of the site, render an expected background image, and to render an image, referred to herein as a target image for insertion into the target area. The target area may be a real, existing surface of the site, such as, for example, a dasher board in a hockey rink. The target area may also be an imaginary surface within the site defined and existing only in the model, for example a (virtual) banner hanging from the ceiling of an arena. By using a three dimensional model of the site to generate the target image, the resulting synthesized image will appear more realistic.

In a preferred embodiment of the invention, a three-dimensional model of selected target areas within a site is defined and rendered using computer aided design (CAD) software, based on the position and perspective of a camera that generates the video. By keeping the model simple, the rendering need not be computationally intense. The target images to be inserted are placed in the model, for example as surface texture maps. Sufficient information for defining the perspective of the camera is collected for each frame within the video. Rendering the model includes the expected background image and the target image that will be inserted. A mask is easily generated from the rendering for removing the original portion of the image within the target area and for inserting the target image in that area. Information on the perspective of a camera can be collected using sensors on the camera or camera mounting and synchronously encoded onto the video signal. Image insertion can therefore take place downstream, for example, at a local affiliate of a television network that is receiving a video feed for an event that is being broadcast. The downstream system would need to be provided with only the model of the site and could have a database of different target images added to the model. Thus, inserted advertising can be tailored to a local audience. In addition, since the information on the perspective of the camera is encoded onto the video signal and is thus available whenever and wherever the video signal is available, different target images may be inserted when the video signal is re-broadcast at later times. Thus, inserting advertising can be tailored to the time of the broadcast, or re-broadcast.

These and additional objects and advantages of the invention will be apparent from the following description of a preferred embodiment of the invention, made with reference to the appended drawings.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Like numbers refer to like elements in the following description.

One application for a real time image insertion system for video according to the present invention is in a live broadcast of a sporting or entertainment event or the like from a stadium, arena, track, course or other sports or entertainment venue. Therefore, such a system is described below in connection with this application. Although this image insertion system has particular advantages when used in this application, it can also be used in other applications.

Figure 1:
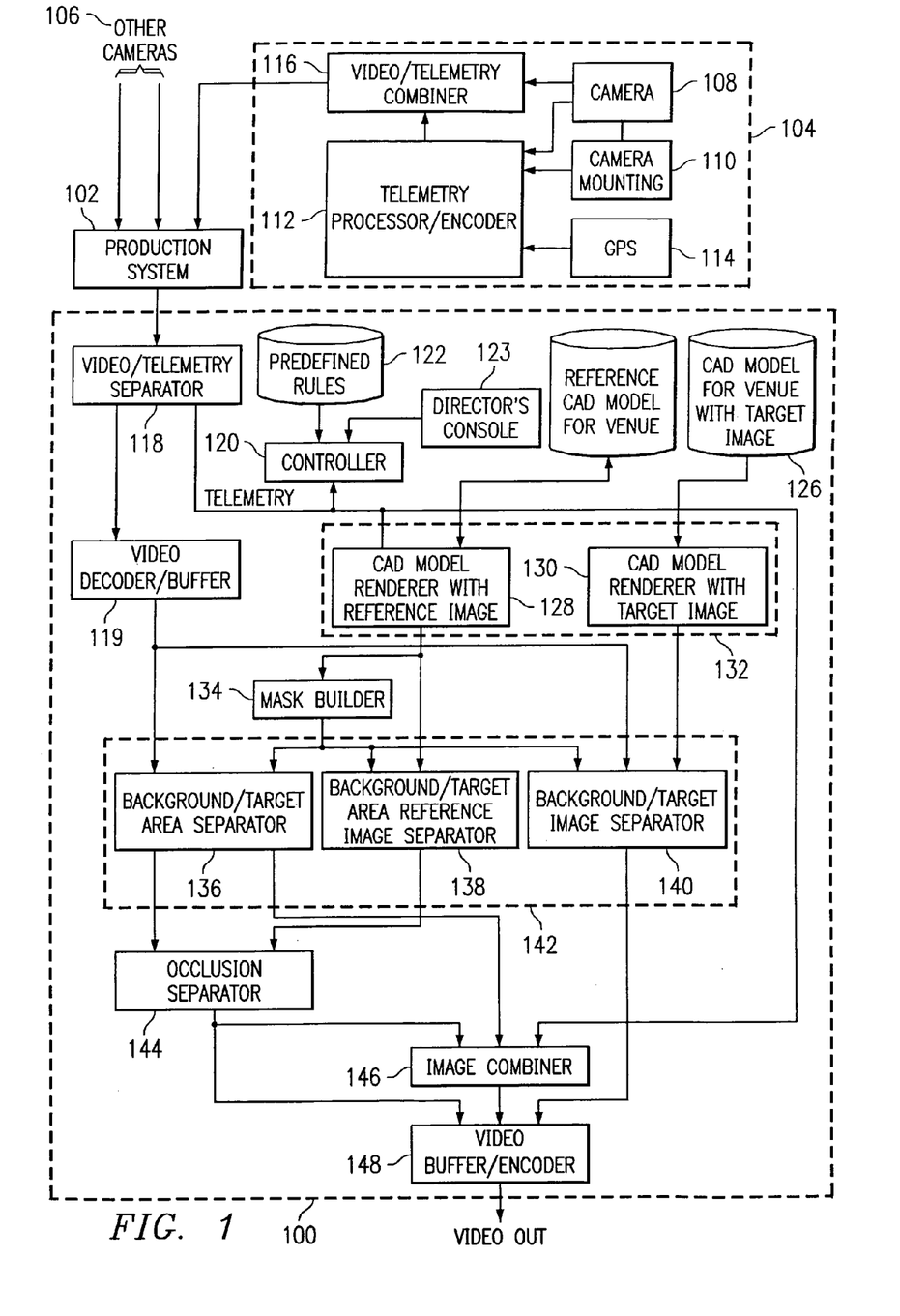
FIG. 1 is a schematic representation of a real time image insertion system for video.

Referring to FIG. 1, a real time image insertion system 100 for video is schematically represented by its primary functional components. These components are implemented as a combination of hardware and software, and are not intended to represent discrete hardware or software components or as being limited to any particular implementation unless otherwise noted.

The image insertion system 100 receives a video signal from a video production system 102. The video production system 102 selects a video signal from video camera system 104 or one of a plurality of other camera systems 106. This selected video signal will then be provided to image insertion system 100 for insertion of images, such as advertising. The image insertion system may be located with the video production system at, for example, a mobile production facility. It may also be remotely at a central production facility or even further downstream, such as at a local television station or cable operator. Alternately, image insertion may take place before selection of a video signal, for example by inserting images in the video signal from each camera system prior to it being provided to the production system.

Figure 2:
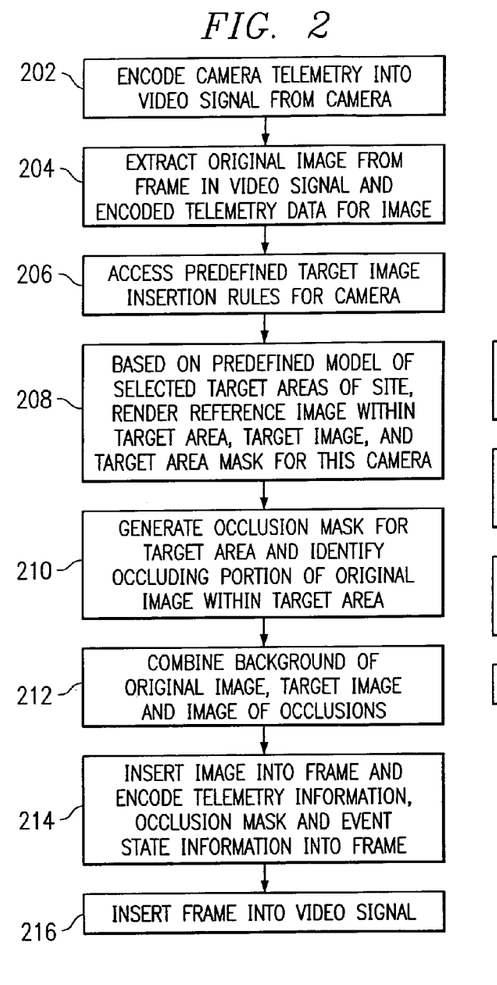
FIG. 2 is a flow diagram of a process for inserting in real time images into video generated by a camera.

The operation of image insertion system 100 will be further described in conjunction with the flow diagram of FIG. 2, which represents an image insertion process that may take place on, for example, image insertion system 100.

Referring now to FIGS. 1 and 2, camera system 104 generates, at step 202, a video signal encoded with telemetry data indicating at least where the camera is pointing in relation to a known or predefined three-dimensional frame of reference of a site. The camera system includes a conventional video camera 108 connected to a camera mounting 110. The mounting includes sensors that generate information indicating the azimuth and elevation, or some other coordinates defining the direction of the focal axis of the camera 108. This telemetry-information is provided to the telemetry processor and encoder 112. Camera 108 or some other attached sensors also provides to the telemetry processor and encoder additional telemetric information indicating the focal length and aperture of the camera's lens. The focal length will vary with the degree of zoom of the lens. The aperture will vary with changing light conditions. Optionally, a global satellite positioning system 114 may also provide information to the telemetry processing and encoder indicating the position of the camera in terms of its longitude, latitude and elevation. The position of the camera can easily be determined and may be permitted to move rather than remain fixed in a predefined location. Using a video timing signal provided by the camera, the telemetry processor and encoder generates a data signal that can be synchronized with the video image generated by the camera. This data signal encodes the telemetric information for each frame of the video signal generated by the camera. A video/telemetry combiner 116, which may be part of the telemetry processor, then combines the data signal with the video signal. With the telemetry information synchronously encoded in the video signal, sufficient information is provided to allow images to be inserted into the signal at any point downstream of the camera system.

Once video insertion system 100 receives an encoded video signal, a video/telemetry separator 118 extracts, as indicated by step 204, the telemetry data for a particular image within the video signal. The video signal is further decoded by a video decoder/buffer 119 to extract and store a video image from each frame of the video signal. An example of a video image generated by a camera is illustrated as video image 400 in FIG. 4. This particular example is of an ice hockey game. It includes a dasher board 402, a first hockey player 404 and a second hockey player 406. The operation of the image insertion system 100 and the image insertion process of FIG. 2 will be described below in reference to image 400. However, the image insertion process will be repeated for a video image in each successive frame, at least to the extent the image changes between frames.

Controller 120 represents a software and hardware entity, or a collection of entities, that coordinate processes occurring within the functional components of image insertion system 100. Using the telemetry data and other information describing an event occurring at the site, for example the inning number of a baseball game, the score or other information on the flow of a sports game, the controller 120 accesses at step 206 predefined image insertion rules in database 122 to determine, based at least in part on a camera identifier embedded in the telemetry data, what image or images—referred to herein as target images—are to be inserted into a particular video image in the frame of a video signal. The target image may be, for example, advertising that will be inserted on a preselected surface—real or imaginary—within the original video image. The area of the site, in which the target image is to be inserted, whether it is a surface of a real object or defined as an imaginary surface or object, is referred to as a target area. Having predefined rules allows a preselected target image to be inserted automatically depending on predefined criteria. For example, a target image may change at predefined times or periods, or based on the status of the event being telecast.

An advertising director, for example, may also monitor and control insertion processes during an event using a director's console 123. The console will include software and hardware for inputting commands and data to the controller 120. For example, the director may provide the system with information concerning the state of the event at the site, if such information is not otherwise available from a database. The director may also override the image insertion rules in database 122 and manually select target material for insertion, or may modify the rules dynamically. The advertising director may also set up and maintain databases that maintain the target images The advertising director's console will include monitors so that the director can monitor the video prior to insertion of target images. The director's console may also allow the director to modify databases storing CAD models for the reference images and the target images, which are described below, and to monitor and adjust steps of the target insertion process, including renderings of the target image and final video image, as described below.

At step 208 of the process of FIG. 2, for each target area within the video image, a reference image within a predefined target area at site and a target image are rendered based on a predefined reference model of the target area of the site. More than one target area may be defined and appear in any given video image. The model is, preferably, a computer aided design (CAD) model that defines surfaces (real or imaginary) of target areas mathematically, allowing the model to be rendered in an image from any angle. The telemetry data extracted from the video signal allows the model to be rendered from a viewpoint that is substantially the same as the view of the camera generating the video image. This rendering, which is in effect a synthesized image of the target areas of the site that is aligned with the video image, is then used to guide insertion of target images into target areas of the video image. If the camera position changes between frames, this rendering takes place for each such frame. However, if it does not change between frames, the renderings for the prior frame may be used.

Figure 4:
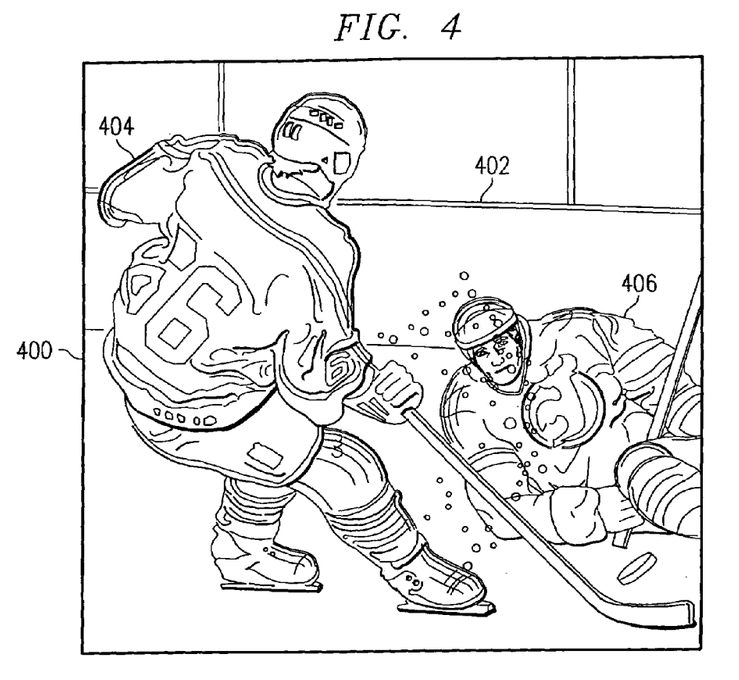
FIG. 4 is a example of a video image generated by a video camera prior to insertion of a target image.
Figure 5:
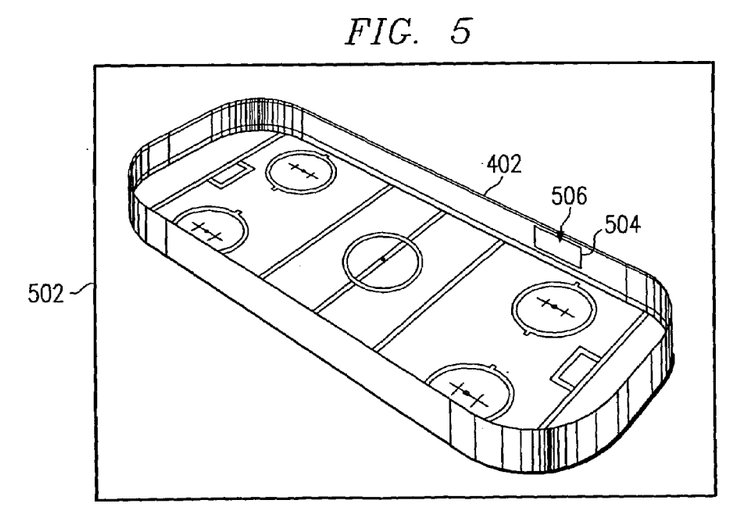
FIG. 5 is a rendering of a model of a site at which the video image of FIG. 4 was taken, in which is defined a target area containing a reference image.
Figure 6:
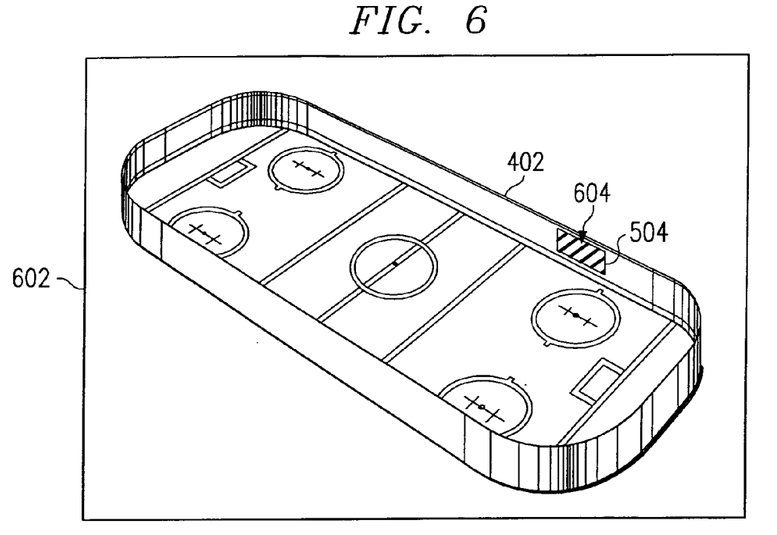
FIG. 6 is a rendering of the model of the site of FIG. 5 with a target image inserted in the predefined target area.

Referring briefly also to FIGS. 4, 5 and 6, image 502 of FIG. 5 is an example of a rendering of a predefined model of the site, in which the video image shown in FIG. 4 was taken. A computer aided design (CAD) system, which can be standard, commercially available CAD software executing on a computer, generates the rendering from the predefined model. Note that the rendering is not made from the same position and camera angle as the video image of FIG. 4. The target area in this example is a predefined area 504 of the surface of the dasher board 402. The model could also have defined imaginary surfaces as target areas. For example, the model could have defined the position of an imaginary banner hung from the ceiling of the hockey arena. A target area surface, real or imaginary, need not be flat. In this figure, the target area has been rendered with a reference image. A reference image is the appearance of a target area surface within the actual site that will be used for occlusion processing. The reference image can be stored, for example, as a bit map image that is inserted into the rendered model. In this particular example, it is a blank white wall. However, it could be a advertising affixed to the target area surface. The reference model of the site with reference images for each target area is stored in a first CAD file 124 shown in FIG. 1. The image insertion system 100 also stores the model with target images embedded in the target areas in a second CAD file 126, also shown in FIG. 1. Image 602 of FIG. 6 is a rendering of the same model as FIG. 5, but with a target image 604 inserted in the target area 504.

Figure 7:
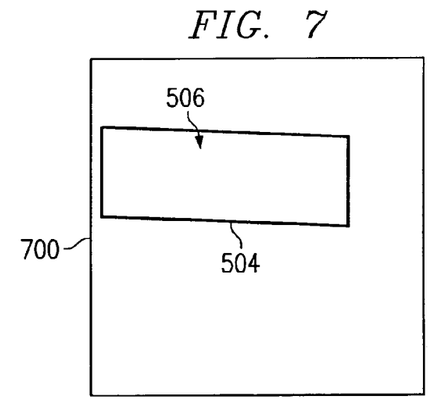
FIG. 7 is an image containing a rendering of the model of the site with the reference image, rendered from the same position and angle of the camera generating the video image of FIG. 4.
Figure 8:
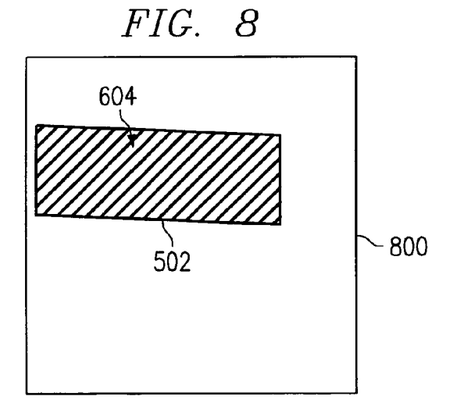
FIG. 8 is an image containing a rendering of the model of the site with the target image, rendered from the same position and angle of the camera generating the video image of FIG. 4.

Referring back to FIGS. 1 and 2, CAD model renderer 128 renders a baseline image 700 of the CAD model stored in CAD file 124, based on the telemetry data from the camera for the video image 400 shown in FIG. 4. Baseline image 700 of FIG. 7 includes target area reference image 506 inserted into target area 504. As previously described, the telemetry data indicates the identification, angle, focal distance and aperture setting of the camera taking the video image. It may also, if the camera's location is not fixed, indicate the position of the camera. Similarly, using the same telemetry data, CAD model renderer 130 generates an image 800, shown in FIG. 8, containing a rendering of the CAD model stored in file 126. This image includes target material 604 inserted into the target area 502. CAD model renderers 128 and 130 are not separate components, but represent different rendering processes or instances of the same rendering engine 132. These processes may occur sequentially, in no particular order, or concurrently. However, the renderers may be implemented using separate CAD rendering engines on the same or on different computers if desired.

Figure 9:
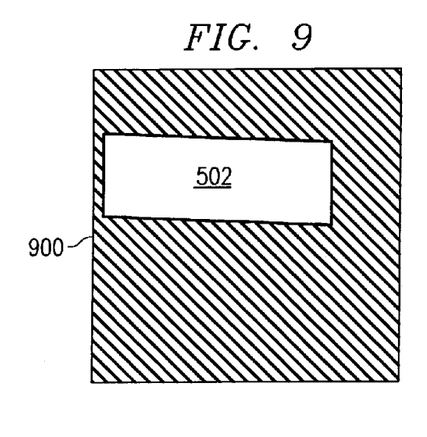
FIG. 9 is a target area processing mask generated from the image of FIG. 7.

Step 208 of the image insertion process shown in FIG. 2 also includes generating a target area, mask FIG. 9 illustrates mask image 900 for the example video image 400 of FIG. 4. The target area mask is generated by a mask builder 134 using the reference image generated by model renderer 128. To generate the mask, all pixels within the target areas are set to a predefined value, and all pixels outside the target area are set to another predefined value. In the mask image 900, a blank area surrounds a white area that defines target area 502.

Figure 3:
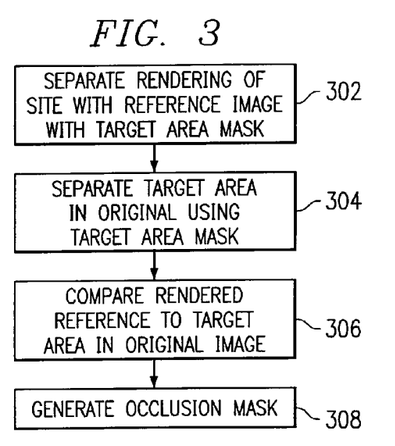
FIG. 3 is a flow diagram of a process for an occlusion processing step in the process of FIG. 2.
Figure 10:
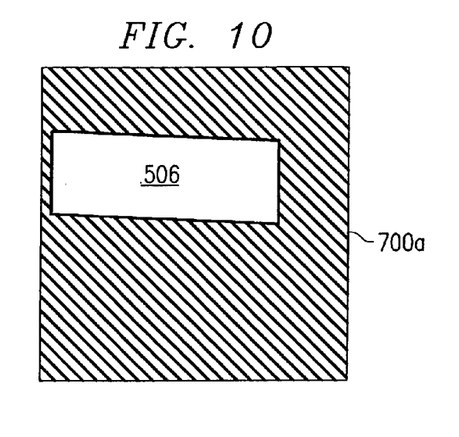
FIG. 10 is a masked reference image generated by applying the mask of FIG. 9 to the image of FIG. 7.
Figure 11:
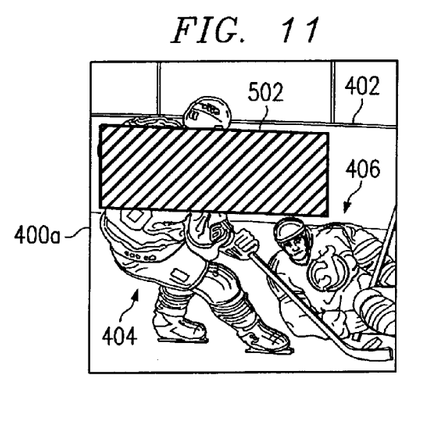
FIG. 11 is a masked background image generated by applying the target area mask of FIG. 9 to the original video image of FIG. 4.
Figure 12:
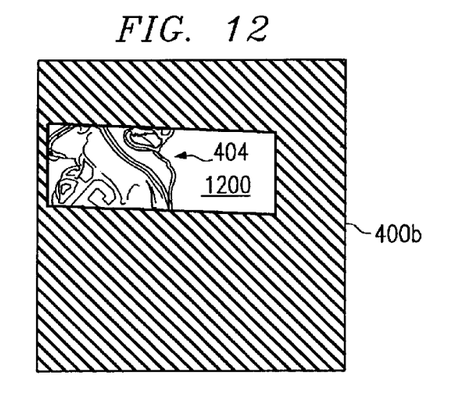
FIG. 12 is a masked target area image generated by applying the target area mask of FIG. 9 to the original video image of FIG. 4.

The target area mask is used for several purposes in connection with occlusion processing step 210 of FIG. 2, the details of which are illustrated by the flow diagram of FIG. 3. Referring now to FIGS. 1 and 3, the target mask is used at step 302 by background/target area reference image separator 138 to separate or mask each target area reference image within the baseline image generated by model renderer 128. In the example illustrated in FIG. 7, the mask will be used to separate the target area reference image 506 within baseline image 700 from the rest of the image, resulting in a masked baseline image 700a shown in FIG. 10. The target mask is used at step 304 to locate and separate within the original video image the target areas from the rest of the non-target areas of the image, which will be referred to as the background. This function is performed by background/target area separator 136. FIG. 11 and FIG. 12 illustrate the two images that result from separating the background from the target area in the original video image 400 shown in FIG. 4. FIG. 11 is a masked background image 400a, which includes all of the original video image except that portion within the target area 502, which is blank. FIG. 12 is a masked target area image 400b, which includes a portion 1200 of the original image 400 that falls within the target area 502. The mask is also used by background/target image separator 140 to separate the target images within the image rendered by model renderer 130. In the example illustrated in FIG. 8, target image 604 will be separated from the remainder of the image 800, resulting in a masked target image rendering 800a shown in FIG. 13 containing the target image 802. Image separators 136, 138 and 140 can be implemented using a single image separation system 142.

Figure 14:
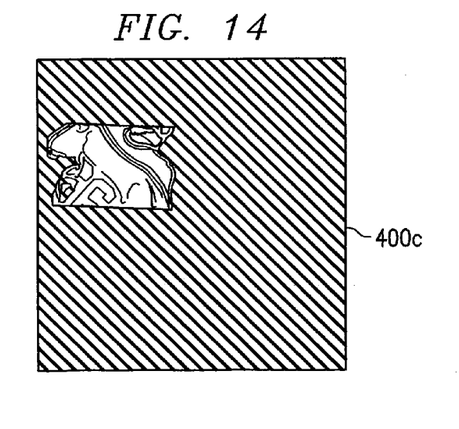
FIG. 14 is an occlusion image generated by comparing the masked target area image of FIG. 12 to the masked reference image of FIG. 10.

Steps 306 and 308 are carried out by occlusion separator 144. In the example video image 400 of FIG. 4, part of the first hockey player is covering a portion of the dasher board 402 where the target material is to be inserted. In order to insert the target material, the portion of the hockey player within the target area, which is referred to as an occlusion, must be separated from the rest of the target area of the original image overlaid on the target image once the target image is inserted into the video image. To make this separation, the occlusion separator 144 compares at step 306 the masked target area image to the masked reference image. Any differences are presumed to be occlusions, i.e. images of objects between the camera and the defined surface of the target area on which the image will be inserted. Small differences between the masked reference image and the masked target image introduced by electronic noise in the camera may be accommodated using a number of techniques commonly practiced in the field of image processing, for example small region suppression. Imprecise positioning of the target area due to errors in the telemetry measurement system may be accommodated by filtering the telemetry data using commonly practiced target tracking techniques, for example Kalman filtering. In the illustrated example, the masked target area image 400*b*, shown in FIG. 12, is compared to the masked baseline image 700*a*, shown in FIG. 10. The resulting occlusion image 400*c* shown in FIG. 14 includes only the occlusion, which are the portions of the hockey player 404 falling within the target area. The rest of the image is blank. The occlusion separator also creates an occlusion mask at step 308. The occlusion mask identifies the portions within the original image that constitute the occlusions. In the example, the occlusion mask is generated from occlusion image 400*c* of FIG. 14.

Figure 13:
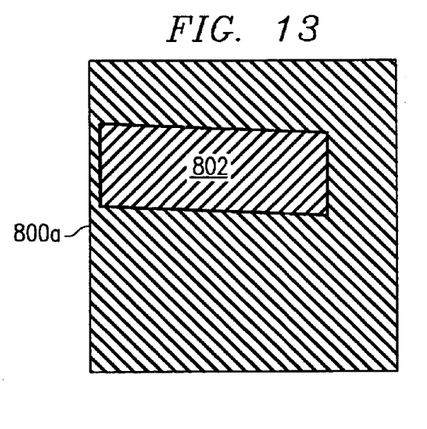
FIG. 13 is a masked target image generated by applying the target area mask of FIG. 9 to the target image of FIG. 8.
Figure 15:
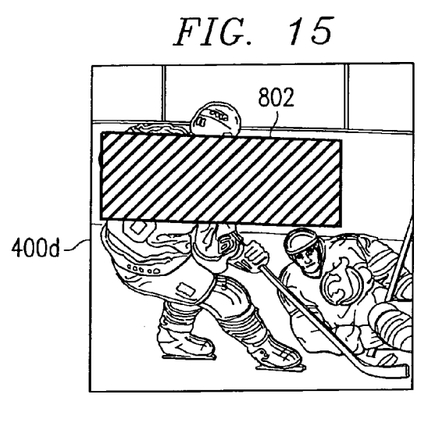
FIG. 15 is an image that is generated by combining the masked target image of FIG. 13 and the masked background image of FIG. 11.
Figure 16:
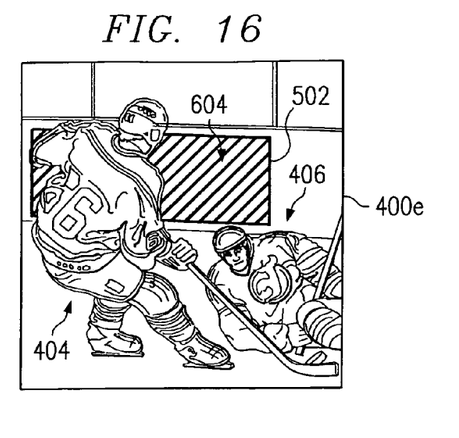
FIG. 16 is a final, composite image, containing an inserted target image, that is generated by combining of the occlusion image of FIG. 14 with the image of FIG. 15.

Referring now only to FIGS. 1 and 2, the masked background image, masked target image and occlusion image are combined at step 212 by image combiner 146 to form a composite image in which the target material has been inserted into the original image. In the illustrated example, the masked background image 400*a*, shown in FIG. 11, and the masked target image 800*a*, shown in FIG. 13, are first combined to generate image 400*d*, shown in FIG. 15. The occlusion image 400*c* is then combined with image 400*d* to produce a final image 400*e*, shown in FIG. 16. The final image includes target image 604 inserted into target area 502.

At step 214 of the image insertion process of FIG. 2, the final image is inserted into a frame of a video signal by video buffer and encoder 148. The video signal is also encoded with the occlusion mask that was generated by the occlusion separator, the telemetry describing the position and angle of the camera originally generating the video, and, optionally, other information describing the state of the game. This permits an image insertion system located downstream to more easily separate occlusions within the image to replace target images inserted upstream with different target images. For example, if the target image is advertising, a local affiliate may insert advertising directed to the particular local market in place of the original advertising. Telemetry information for the particular video image is also synchronously encoded into the signal to permit the downstream image insertion. The inserted information may be encrypted to prevent its use for other than the intended purpose.

Figure 17:
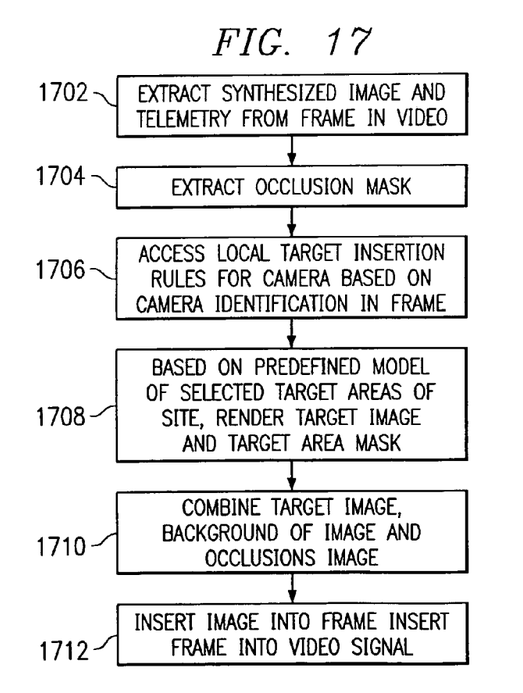
FIG. 17 is a process for real time insertion of images in video downstream of a first image insertion process.

FIG. 17 illustrates a downstream image insertion process. An image insertion system used at a downstream location is substantially similar to that shown in FIG. 1. Downstream image insertion processing, if desired, begins at step 1702 with the extraction from a frame of a video signal, a video image and synchronized telemetry information for the image. This step is performed in a manner similar to that of step 204 in FIG. 2. At step 1704, the occlusion mask is extracted from the frame. At step 1706, local insertion rules are accessed based on the identification of the camera contained in the telemetry data. This step is performed in a manner similar to that of step 206 of FIG. 2. In the same manner as process step 208 of FIG. 2, the local image insertion system renders at step 1708 an image of the site containing a target image based on a predefined model of the site containing the image. This is the same basic model of the site that is used upstream. However, different target images may be embedded in it. A target area mask is then also generated. At step 1710, occlusion processing and image combining takes place. It is similar in many respects to the occlusion processing steps 210 and 212 of FIG. 2. A masked background image of the received video image is generated using the target area mask. An occlusion image is also generated from the received video image using the extracted occlusion mask. Unlike the process of FIG. 2, no masked reference image needs to be generated to create an occlusion image. The masked background image and masked target image are combined, and then the occlusion image is combined with this image to generate a final composite image. The composite image is then inserted into a frame on a video signal for transmission at step 1712.

The forgoing description is made in reference to exemplary embodiments of the invention. However, an embodiment may be modified or altered without departing from the scope of the invention, which scope is defined and limited solely by the appended claims.

What is claimed is:

1. A method for inserting a target image into an image stream of a real site taken by a camera, the method comprising:
   receiving a stream of original images taken by a camera of a real, three-dimensional site;
   for each original image in the image stream,
   identifying a background area within the original image from at least one target area in which a target image will be inserted;
   rendering, for each at least one target area, a target image based on at least a productions three-dimensional model of the at least one target area within the site and the camera's position and pointing direction, wherein the target area is comprised of a virtual surface that does nor exist within the site;
   identifying occlusions within the at least one target area of the original image; and
   combining the background of the original image, the at least one target image, and the image of the occlusions into an output image.

2. The method of claim 1, wherein identifying a background area within the original image includes identifying at least one target area within the image based on a predefined model of selected surfaces of the site and the camera's position and pointing direction.

3. The method of claim 2, wherein identifying at least one target area within the image comprises:
   receiving camera parameters, the camera parameters including parameters indicating the pointing direction of the camera;
   rendering the predefined model from the camera's position, based on the camera parameters; and
   generating from the rendering a mask for defining the target area within the image.

4. The method of claim 3, wherein the camera parameters included parameters indicating the camera's position within the site.

5. The method of claim 3, wherein the camera's position is predefined within the model.

6. The method of claim 1, wherein rendering, for at least one target area, a target image comprises:
   receiving camera parameters, the camera parameters including parameters indicating the pointing direction of the camera; and
   rendering the predefined model based at least in part on the camera parameters.

7. The method of claim 6, wherein the camera's position is predefined within the model.

8. The method of claim 6, wherein the camera parameters includes parameters indicating the camera's position within the site.

9. The method of claim 8 wherein the camera parameters are encoded onto a video signal generated by the camera.

10. The method of claim 1 wherein identifying occlusions within the image of the target area includes:
rendering the predefined model of the site with a reference image inserted in each of the at least one target areas; and
comparing the reference image to the target area within original image.

11. The method of claim 1 further including encoding the output image and camera parameters onto an output video signal, the camera parameters including parameters indicating the pointing direction of the camera.

12. An apparatus for inserting a target image into video of a real site taken by a camera, the apparatus comprising:
a model renderer for generating, a synthetic image based on a predefined three-dimensional reference model of a target area with a site from a known position of a camera, the target area including a virtual surface that does not exist within the site, the synthetic image having a target image inserted in the target area;
an image separator for masking from a video image contained within a frame of a video signal generated by the camera, the target area to create a masked background image; and
an image combiner for combining the masked background image with the target image.

13. The apparatus of claim 12 further comprising:
a second model renderer for generating a second synthetic image based on the predefined reference model of the site, the second synthetic image having a reference image inserted into the target area; and
an occlusion separator for comparing the reference image of the second synthetic image to the target area of the video image and generating an image of occlusions within the target area of the video image;
wherein the combiner further combines the image of the occlusions with the masked background image and the target image.

14. A method for inserting a target image into an image stream of a real site taken by a camera, the method comprising:
receiving a stream of original images taken by a camera of a real site;
for each original image in the image stream;
identifying a background area within the original image from at least one target area in which a target image will be inserted by identifying at least one target area within the image based on a predefined model of selected surfaces of the site and the camera's position and pointing direction, the target area including a virtual surface that does not exist within the site, wherein identifying at least one target area within the image includes:
receiving camera parameters, the camera parameters including parameters indicating the pointing direction of the camera;
rendering the predefined model from the camera's position, based on the camera parameters; and
generating from the rendering a mask for defining the target area within the image;
rendering, for each at least one target area, a target image based on at least a predefined three-dimensional model of the at least one target area within the site and the camera's position and pointing direction, the camera's position being predefined within the model, wherein rendering includes receiving camera parameters, the camera parameters including parameters indicating the pointing direction of the camera, and rendering the predefined model based at least in part on the camera parameters;
identifying occlusions within the at least one target area of the original image;
combining the background of the original image, the at least one target image, and the image of the occlusions into an output image.

15. The method of claim 14 wherein identifying occlusions within the image of the target area includes:
rendering the predefined model of the site with a reference image inserted in each of the at least one target areas; and
comparing the reference image to the target area within original image.

16. The method of claim 14 further including encoding the output image and camera parameters onto an output video signal, the camera parameters including parameters indicating the pointing direction of the camera.

17. A method for inserting a target image into an image stream of a real site taken by a camera, the method comprising:
receiving a stream of original images taken by a camera of a real site;
for each original image in the image stream,
identifying a background area within the original image from at least one target area in which a target image will be inserted;
rendering, for each at least one target area, a target image based on at least a predefined three-dimensional model of the at least one target area within the site and the camera's position and pointing direction, the three-dimensional model being of less than the entire site;
identifying occlusions within the at least one target area of the original image; and
combining the background of the original image, the at least one target image, and the image of the occlusions into an output image.

18. The method of claim 17, wherein identifying a background area within the original image includes identifying at least one target area within the image based on a predefined model of selected surfaces of the site and the camera's position and pointing direction.

19. The method of claim 18, wherein identifying at least one target area within the image comprises:
receiving camera parameters, the camera parameters including parameters indicating the pointing direction of the camera;
rendering the predefined model from the camera's position, based on the camera parameters; and
generating from the rendering a mask or defining the target area within the image.

20. The method of claim 19, wherein the camera parameters included parameters indicating the camera's position within the site.

21. The method of claim 19, wherein the camera's position is predefined within the model.

22. The method of claim 17, wherein rendering, for at least one target area, a target image comprises:
receiving camera parameters, the camera parameters including parameters indicating the pointing direction of the camera; and rendering the predefined model based at least in part on the camera parameters.

23. The method of claim 22, wherein the camera's position is predefined within the model.

24. The method of claim 22, wherein the camera parameters includes parameters indicating the camera's position within the site.

25. The method of claim 24 wherein the camera parameters are encoded onto a video signal generated by the camera.

26. The method of claim 17 wherein identifying occlusions within the image of the target area includes:
   rendering the predefined model of the site with a reference image inserted in each of the at least one target areas; and
   comparing the reference image to the target area within original image.

27. The method of claim 17 further including encoding the output image and camera parameters onto an output video signal, the camera parameters including parameters indicating the pointing direction of the camera.

28. An apparatus for inserting a target image into video of a real site taken by a camera, the apparatus comprising:
   a model renderer for generating a synthetic image based on a predefined three-dimensional reference model including a target area within a site from a known position of a camera, the three-dimensional model being of less than the entire site, the synthetic image having a target image inserted in the target area;
   an image separator for masking from a video image contained within a frame of a video signal generated by the camera, the target area to create a masked background image; and
   an image combiner for combining the masked background image with the target image.

29. The apparatus of claim 28 further comprising:
   a second model renderer for generating a second synthetic image based on the predefined reference model of the site, the second synthetic image having a reference image inserted into the target area; and
   an occlusion separator for comparing the reference image of the second synthetic image to the target area of the video image and generating an image of occlusions within the target area of the video image;
   wherein the combiner further combines the image of the occlusions with the masked background image and the target image.

* * * * *